Jan. 19, 1954    M. H. GROVE ET AL    2,666,614
VALVE CONSTRUCTION
Filed May 15, 1948    2 Sheets-Sheet 1
FIG_1_
FIG_2    FIG_3
FIG_4_
FIG_5_
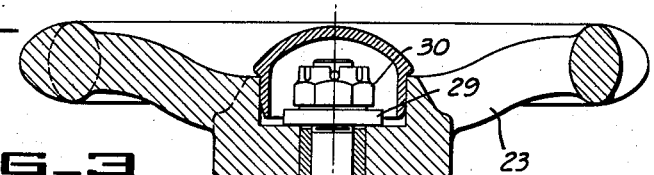
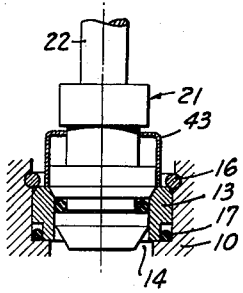
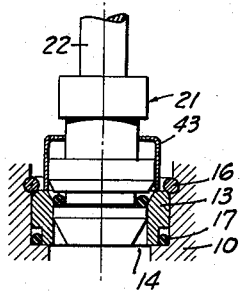
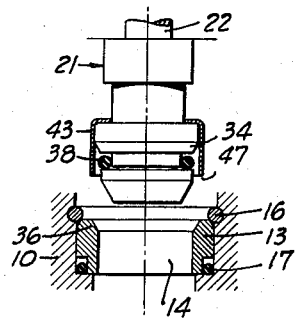
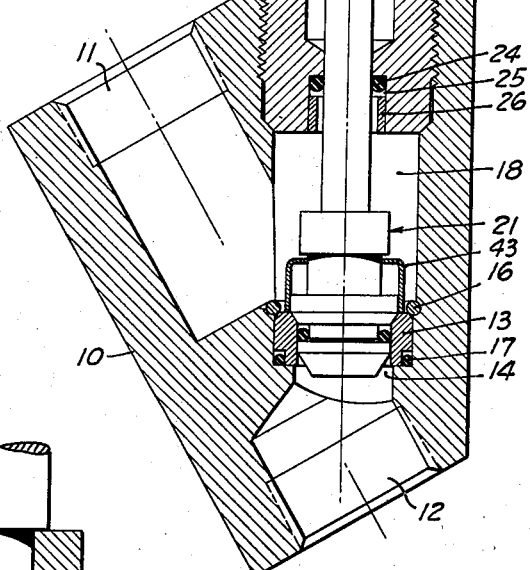
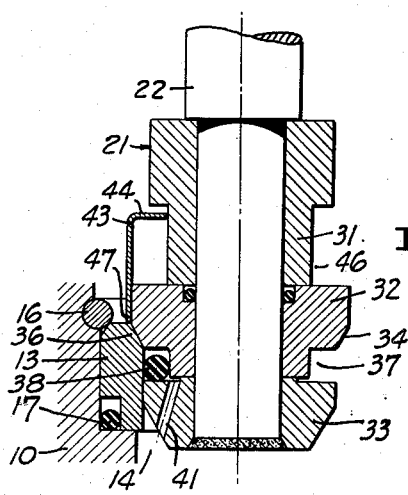
INVENTORS
Marvin H. Grove
BY Austin U. Bryant
ATTORNEYS Jan. 19, 1954    M. H. GROVE ET AL    2,666,614
VALVE CONSTRUCTION
Filed May 15, 1948    2 Sheets-Sheet 2
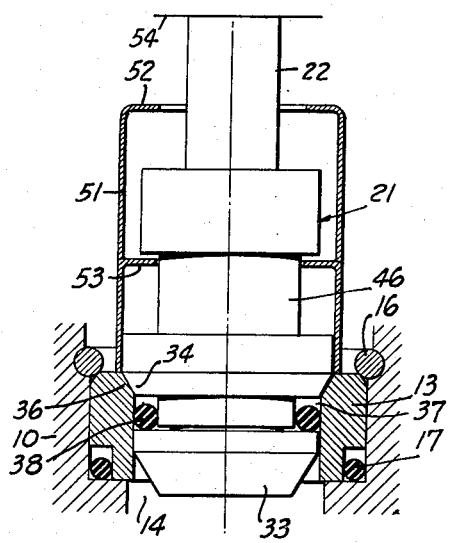
FIG_6_
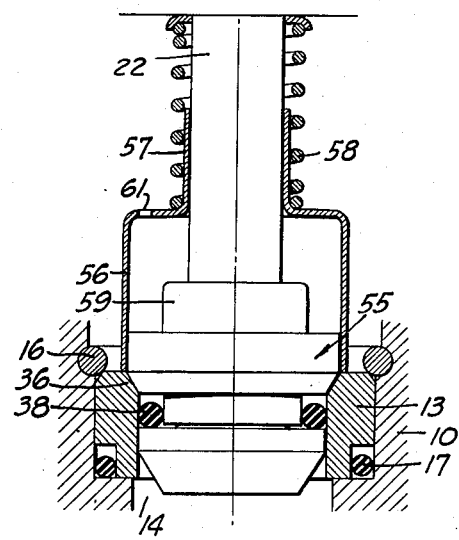
FIG_7_
INVENTORS
Marvin H. Grove
BY Austin U. Bryant
ATTORNEYS Patented Jan. 19, 1954

2,666,614

UNITED STATES PATENT OFFICE 2,666,614

VALVE CONSTRUCTION

Marvin Henry Grove, Piedmont, and Austin U. Bryant, Berkeley, Calif., assignors, by mesne assignments, to Grove Regulator Company, Oakland, Calif., a corporation of California Application May 15, 1948, Serial No. 27,308

2 Claims. (Cl. 251—27)

This invention relates generally to valves of the type utilizing a valve member movable between open and closed positions for controlling flow of fluid.

In the past it has been proposed to utilize annular seal rings made of synthetic resilient rubber for the purpose of sealing the movable member of a valve against leakage. However, where the valve is used in such a manner that high fluid velocities occur about or impinge against the valve member, the resilient seal ring is apt to be dislodged from its retaining groove. It is an object of the present invention to generally improve upon valves of this type by the provision of means which serve to effectively prevent such dislodgment of the resilient seal ring when the valve member is moved to open or partially open position.

It is a further object of the invention to provide an improved arrangement as described above in which the guard member moves automatically between seal ring protecting and out-of-the-way positions, in response to movement of the valve member between open and closed positions.

A further object of the invention is to provide a valve having both metal to metal and O-ring sealing means, and which is provided with means for protecting both sealing means when the valve is opened.

Additional objects of the invention will appear from the following description in which the preferred embodiments have been set forth in detail in conjunction with the accompanying drawing.

Referring to the drawing:

Figure 1 is a side elevational view in section illustrating a valve incorporating the invention.

Figures 2, 3 and 4 are cross-sectional details serving to illustrate three different operating positions for the valve of Figure 1.

Figure 5 is an enlarged cross-sectional detail illustrating particularly the detail construction for the valve member.

Figure 6 is a cross-sectional detail illustrating another embodiment of the invention.

Figure 7 is a view like Figure 6 and showing another embodiment of the invention.

The valve illustrated in Figures 1 to 5 is of the manual operated type, and consists of a body 10 having inflow and outflow passages 11 and 12, which are adapted to be connected to associated piping. An annular seat ring 13, made of suitable metal, is disposed within the body, and forms an annular throat orifice 14 which connects the passages 11 and 12, when the valve member is in open position. In order to seal the ring 13 with respect to the body, the ring may be held in position by soldering, brazing, or welding, or as illustrated it may be retained in place by the snap ring 16 and sealed with respect to the body by the resilient O ring 17.

The bore 18 which extends in alignment with the seat ring 13 is fitted with a bonnet 19. The movable valve member 21 is attached to one end of the operating stem 22, and this stem extends through the bonnet 19 for operative attachment to the hand wheel 23. Suitable means is provided for forming a seal between the stem 22 and the bonnet 19, such as the resilient O ring 24, which is disposed in the annular recess 25, and held in place by the retainer ring 26.

As a part of the valve operating means, a bushing 27 is journaled upon the stem 22 and is threaded in the bonnet 19. The outer end of this bushing has a driving connection with the hand wheel 23. The inner end of bushing 27 engages a collar 28 which is fixed to stem 22, and the outer end of the bushing may abut a thrust washer 29, which is retained upon rod 22 by the nut 30. Thus upon turning the hand wheel 23 the valve stem 22 is moved in opposite directions to move the valve member 21 between open and closed positions. It will be evident that other types of operating means can be employed, such as pneumatic or hydraulic pressure operated diaphragms or pistons.

The construction of the valve member 21 and its associated parts can best be understood by reference to Figures 2 and 5. It consists of the three annular parts 31, 32 and 33, which are mounted on the lower portion of the valve stem 22. Part 32 is provided with a conical shaped valve surface 34, which is adapted to seat upon the conical shaped valve surface 36 formed on the seat ring 13. Below the valve surface 34, the part 32 is formed to provide the annular recess or groove 37 within which is disposed the annular seal ring 38. This seal ring is formed of suitable resilient material such as resilient synthetic rubber. In this instance it is what is generally referred to as a resilient O ring, in that it is circular in transverse cross-section. The recess or groove 37 is so dimensioned that the seal ring is compressed in a radial direction, and it is shaped as illustrated, with spaced parallel side walls at right angles to the bottom of the groove. The lower corner of the groove 37, below the resilient seal ring 38, is vented to the outflow passage 12. For this purpose one or more vents or ducts 41 are shown in the part 33. The parts 31, 32 and 33 are held together by suitable means such as a weld connection between part 33 and the valve stem.

Surrounding the valve part 31 there is a guard or protector 43 in the form of an annular shell. A flange 44 on one end of this guard is loosely accommodated on the annular portion 46 of the valve part 31. The other end portion of the guard 43, designated at 47, is adapted to engage the adjacent end face of the seat ring 13, about the conical portion 36. The permissible movement between the guard 43 and the valve member is such that for open position of the valve illustrated in Figure 4, guard 43 assumes a position in which it generally embraces the seal ring 38, and serves by deflecting action to protect it against fluid blast.

Operation of the valve described above is as follows: For closed position of the valve illustrated in Figure 2, the seal ring 38 forms an effective seal between the valve member and the seat ring 13, and an additional seal is formed by the conical surfaces 34 and 36. When the valve member is moved toward open position, the guard 43 remains in engagement with the seat ring 13, while the seal ring 38 is moved upwardly toward the upper end of the seat ring 13. Figure 3 illustrates the valve member in a position beyond which flow commences to occur past the valve member. As illustrated in this view the seal ring 38 is about to be moved sufficiently far to disengage it from the seat ring 13, while the guard 43 remains in engagement with the upper end face of the seat ring, but generally embraces the conical valve surface 34.

As the valve member is moved beyond the position illustrated in Figure 3, the seal ring 38 is disengaged from the seat ring, but at this time only a small amount of flow occurs past the valve member, due to the relatively small clearance between the outer periphery of the valve part 33, and the seat ring 13. In this connection the flow may also be restricted by the clearance between the guard 43 and the valve part 31, and likewise the clearance between the guard and the upper end face of the seat ring 13. At this time the vent 41 also tends to aid in retaining the seal ring 38 in the recess 37, for the reasons explained in co-pending application Serial No. 3,728, filed January 22, 1948 (which claims subject matter disclosed but not claimed herein). Briefly the corner of the recess 37 below the seal ring 38 is vented to the outflow side through the vent 41, thus reducing the pressure applied to the adjacent portion of the ring to thereby aid in holding the same in the recess 37. Assuming that the valve is in the position shown in Figure 1, by the time the valve member has been raised sufficiently far to commence clearing the valve part 33 with respect to the inner periphery of seat ring 13, the seal ring 38 is generally embraced within the lower margin of the guard 43. Thereafter the guard is lifted together with the valve member, whereby the parts are moved to the full open position illustrated in Figure 4. While moving to full open position flow through the valve cannot dislodge the resilient seal ring 38, because this ring is protected against the blast of fluid flow by the guard 43. Should the valve be so positioned that the guard is not in contact with seat ring 13 at the commencement of an opening operation, fluid flow will force it into such position after ring 38 has been cleared from sealing engagement with seat ring 13, and before fluid flow has attained such value as to cause dislodgement of the O ring. Likewise should the guard assume a position in which it does not protect the O ring, with the valve open and little or no differential being applied, the application of a pressure differential will cause the guard to be moved to ring protecting position before the flow has assumed such a value as to dislodge the O ring.

It is not necessary for the guard to be dimensioned so that it completely encloses the seal ring. Thus good results have been secured by dimensioning the guard so that when in seal ring protecting position, its lower end is in a plane passing through the central axis of the seal ring.

A valve of the above type is adapted for relatively high pressures and flow rates, as for example pressure differentials of the order of 1500 p. s. i. or more.

Figure 6 shows a modification of the guard 43. In this instance the guard 51 is extended beyond the upper end of the part 31, and is provided with both upper and intermediate flanges 52 and 53. The purpose of this arrangement is to provide positive means for insuring movement of the guard to its seal ring protecting position. Thus when the valve shown in Figure 6 is in full open position, flange 52 engages the adjacent portion 54 of the valve body, thus insuring that the guard is positioned in such a manner as to generally embrace the seal ring.

In connection with the modifications of Figures 5 and 6, here again flow of fluid through the valve can normally be relied upon to insure proper positioning of the guard as the valve member is moved toward open position, to thereby bring the guard into seal ring protecting position before the flow is capable of dislodging the seal ring. Thus it has been found that the guard will operate in the manner desired even where the valve is mounted in such a manner that the valve member is inverted.

Where it is not desirable to rely upon fluid flow to insure proper positioning of the guard, the arrangement shown in Figure 7 can be employed. In this instance the valve part 55 corresponds to the parts 31 and 32 of Figure 2, except for the modified shaping, and the guard 56 has a tubular extension 57, which slidably fits upon the stem 22. A compression spring 58 surrounds the stem 22 and urges the guard 56 toward the seat 13. When the valve member has been moved toward open position sufficiently far to break the seal between seal ring 38 and the seat 13, the seal ring is in a protected position within the lower margin of the guard 56, and the collar 59 on the stem 22 comes into abutting relation with the lower end of the tubular extension 57. Thereafter the guard moves with the valve member against the force of compression spring 58 to full open position. It will be evident that with this arrangement the compression spring insures positive action of the guard, and proper positioning of the guard at all times irrespective of fluid flow. A vent opening 61 can be provided in the guard 56, to equalize the pressures upon opposite sides of the same, thereby making it unnecessary to construct the guard sufficiently strong to withstand relatively high differential pressures.

In all of the embodiments described above the conical valve surfaces 34 and 36 serve to limit closing movement of the valve member, and in addition they provide a secondary emergency seal in the event any damage should occur to the resilient seal ring 38.

Reference is made to our copending applications 250,417 filed October 9, 1951; 250,418 filed October 9, 1951; and 250,419 filed October 9, 1951, disclosing and claiming subject matter originally disclosed and claimed herein.

We claim:

1. In a valve construction, a valve body member having inlet and outlet passages and formed to provide an annularly contoured throat orifice connecting said passages, said body providing a conical shaped valve seating surface on the inlet side of said throat orifice and a cylindrical orifice portion adjacent the conical surface, a valve member positioned within said body and movable in opposite directions between open and closed positions relative to the throat orifice, said valve member including a metal portion formed to provide a conical shaped valve working surface adapted to have abutting sealing engagement with the seating surface of the valve body for closed position of the valve member, said valve member also including a cylindrically shaped portion adapted to extend and fit into said cylindrical portion of the throat orifice for closed position of the valve member and to be retracted from the throat orifice for open position of the valve member, said valve member being formed to provide an annular groove in said cylindrical shaped portion of the valve member, a resilient seal ring disposed within said groove and proportioned to be compressed in a radial direction within said cylindrical throat portion for closed position of the valve member to thereby form a fluid-tight seal between the valve member and the body, and an annular guard slidably carried by the valve member on the inlet side of the throat orifice, said guard for open position of the valve member being positioned to substantially embrace both said valve working surface and the resilient seal ring, and for closed position being retained adjacent the inlet side of said seating surface but in non-embracing relation with both the seal ring and said valve working surface.

2. A valve as in claim 1 in which that portion of the guard which embraces the seal ring for open position of the valve has an internal diameter substantially greater than the external diameter of the seal ring.

MARVIN HENRY GROVE.
AUSTIN U. BRYANT.

References Cited in the file of this patent

UNITED STATES PATENTS

| Number | Name | Date |
|---|---|---|
| 382,469 | Hawthorne | May 8, 1888 |
| 969,803 | Pollock | Sept. 13, 1910 |
| 1,072,796 | Vance | Sept. 9, 1913 |
| 1,293,858 | Mills | Feb. 11, 1919 |
| 1,385,019 | Mathieu | July 19, 1921 |
| 2,299,395 | Karlberg | Oct. 20, 1942 |
| 2,370,471 | Karlberg | Feb. 27, 1945 |
| 2,370,964 | Janette | Mar. 6, 1945 |
| 2,408,000 | Schiller | Sept. 24, 1946 |
| 2,414,451 | Christensen | Jan. 21, 1947 |
| 2,431,437 | Van Der Werff | Nov. 25, 1947 |
| 2,469,921 | Hoge | May 10, 1949 |

FOREIGN PATENTS

| Number | Country | Date |
|---|---|---|
| 40,549 | Germany | of 1887 |